United States Patent [19]

Biesemeyer

[11] 4,206,910
[45] Jun. 10, 1980

[54] TABLE SAW FENCE SYSTEM

[76] Inventor: William M. Biesemeyer, 1001 N. 43rd Ave., Lot H46, Phoenix, Ariz. 85009

[21] Appl. No.: 920,001

[22] Filed: Jun. 28, 1978

[51] Int. Cl.² .......................... B25B 5/08; B23Q 3/02
[52] U.S. Cl. ..................... 269/236; 83/438; 83/522; 144/253 R; 269/285; 269/303; 269/307; 269/315
[58] Field of Search ............. 144/2 R, 253 R; 83/438, 83/522; 269/303, 304, 318, 236, 285, 307, 315

[56] References Cited

U.S. PATENT DOCUMENTS

| | | | |
|---|---|---|---|
| 2,325,082 | 7/1943 | Tautz | 83/438 |
| 2,622,637 | 12/1952 | Gusfin | 83/438 |
| 2,675,033 | 4/1954 | Hess | 83/438 |
| 2,740,437 | 4/1956 | Odlum et al. | 83/438 |
| 2,744,549 | 5/1956 | Johnson | 144/253 R |
| 2,779,360 | 1/1957 | Snow | 144/253 R X |
| 2,808,084 | 10/1957 | Eschenburg et al. | 83/438 |
| 3,249,351 | 5/1966 | Smith | 269/236 |
| 3,315,716 | 4/1967 | Mytinger | 83/438 |

Primary Examiner—Robert Louis Spruill
Assistant Examiner—W. D. Bray
Attorney, Agent, or Firm—Cahill, Sutton & Thomas

[57] ABSTRACT

A longitudinally extending support is secured to the table of a table saw to which a guide rail is secured. A saw fence, having a shoe secured thereto, includes a clamping arm extending therefrom. The shoe slidably engages the guide rail and may be clamped together with the fence to the guide rail. A scale is formed on the guide rail and an index is attached to the shoe and positioned to register with the scale.

7 Claims, 6 Drawing Figures

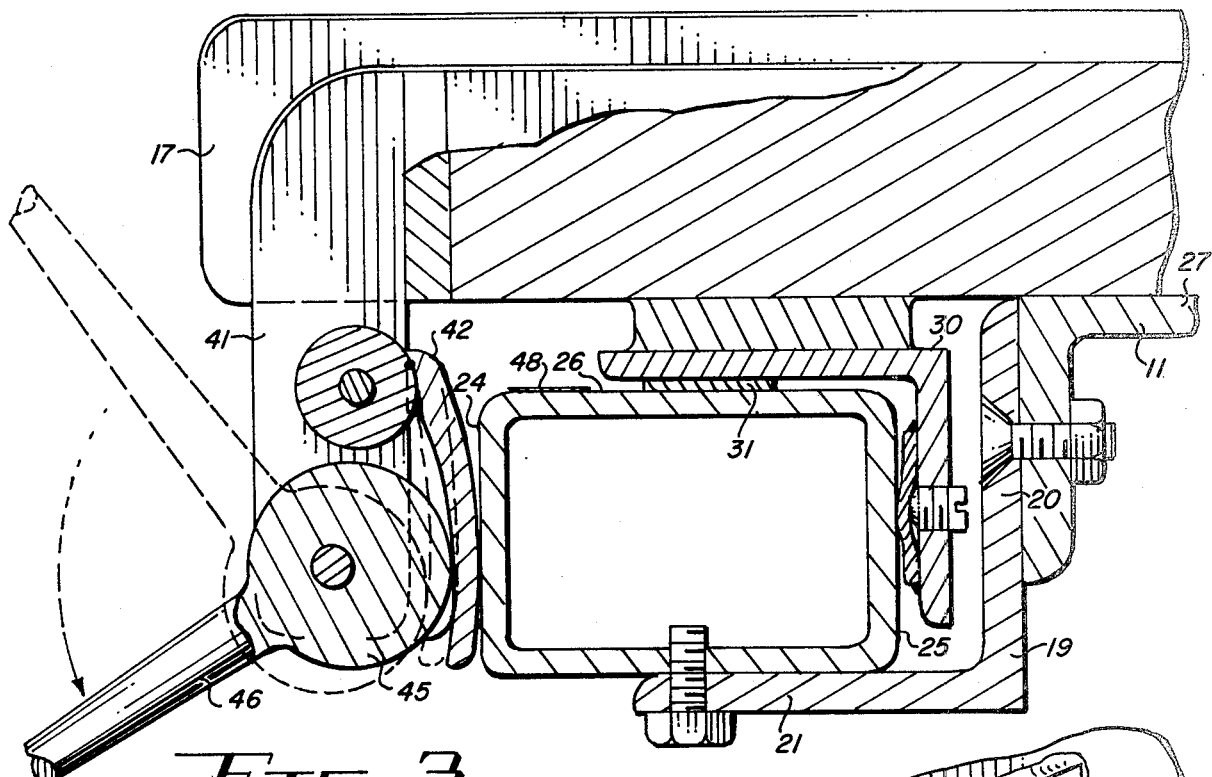
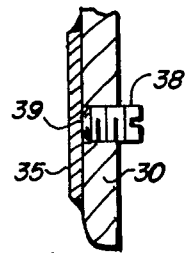
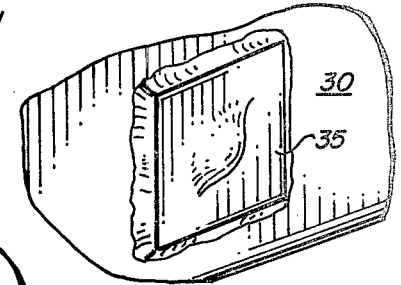
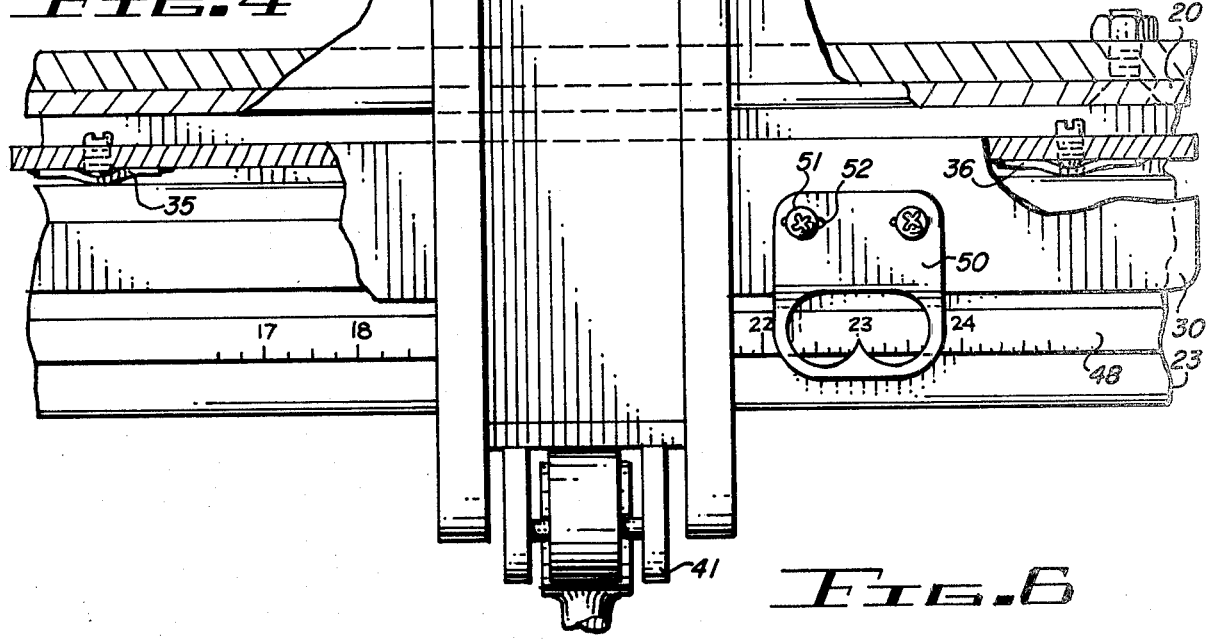

TABLE SAW FENCE SYSTEM

The present invention pertains to apparatus for measuring the cut to be taken by a table saw, and more particularly to an improved saw fence system for attachment to a table saw.

When cutting lumber with a table saw, it is usually necessary to use some sort of guide or fence for the workpiece to insure the dimensions of the workpiece after the cut. Such guides or fences are usually adjustably positionable on the work table so that they can be secured in a predetermined position with respect to the saw blade; in this manner, the position of a cut to be taken by the saw is determined and the workpiece is continuously as it passes the saw.

Positioning the fence usually requires measuring the distance from the saw blade to the fence with a tape measure which is invariably carried by the workman. The time required for unlocking, measuring, adjusting, and relocking the fence using this prior art technique is very time consuming. While the task of measuring is theoretically a simple one, in lumber yards where table saws are used almost continuously, or in cabinet shops where speed and accuracy are important, the time required for setting up a particular cut is a substantial percentage of the total time consumed.

It is therefore an object of the present invention to provide an improved table saw fence system that may permit rapid positioning of a table saw fence.

It is another object of the present invention to provide an improved table saw fence system wherein the fence may more accurately be positioned.

It is still another object of the present invention to provide a table saw fence system that will permit significant increase in the efficiency of setting up the table saw for an accurate cut.

Briefly, and in accordance with the embodiment chosen for illustration, the present invention incorporates a support member having an "L" shaped cross section secured to the work table of a table saw. A guide rail is secured to the support member and extends parallel to the top surface of the work table. The guide rail incorporates a scale extending therealong to provide an immediate indication of the distance between the saw and a fence. A fence is secured to a shoe that slidably engages the guide rail and includes an index positioned for registration with the scale. The fence includes a clamping arm having a cam rotatably secured thereto for releasably engaging the guide rail. The shoe includes a pair of contact pads for engaging the guide rail on one side thereof opposite the cam. The contact pads and the cam provide a three point clamp on the guide rail to firmly secure the shoe and attached fence in a desired position at a distance from the saw blade indicated by the position of the index on the scale.

The present invention may more readily be described by reference to the accompanying drawings in which:

FIG. 3 is a cross-sectional view of FIG. 2 taken along lines 3—3.

FIG. 4 is a cross-sectional view of a contact pad useful for describing the adjustments provided thereby.

FIG. 5 is a perspective view of a contact pad useful in describing the operation of the contact pads.

FIG. 6 is a top view, partly broken away, of the apparatus of FIG. 2.

Figure 1:
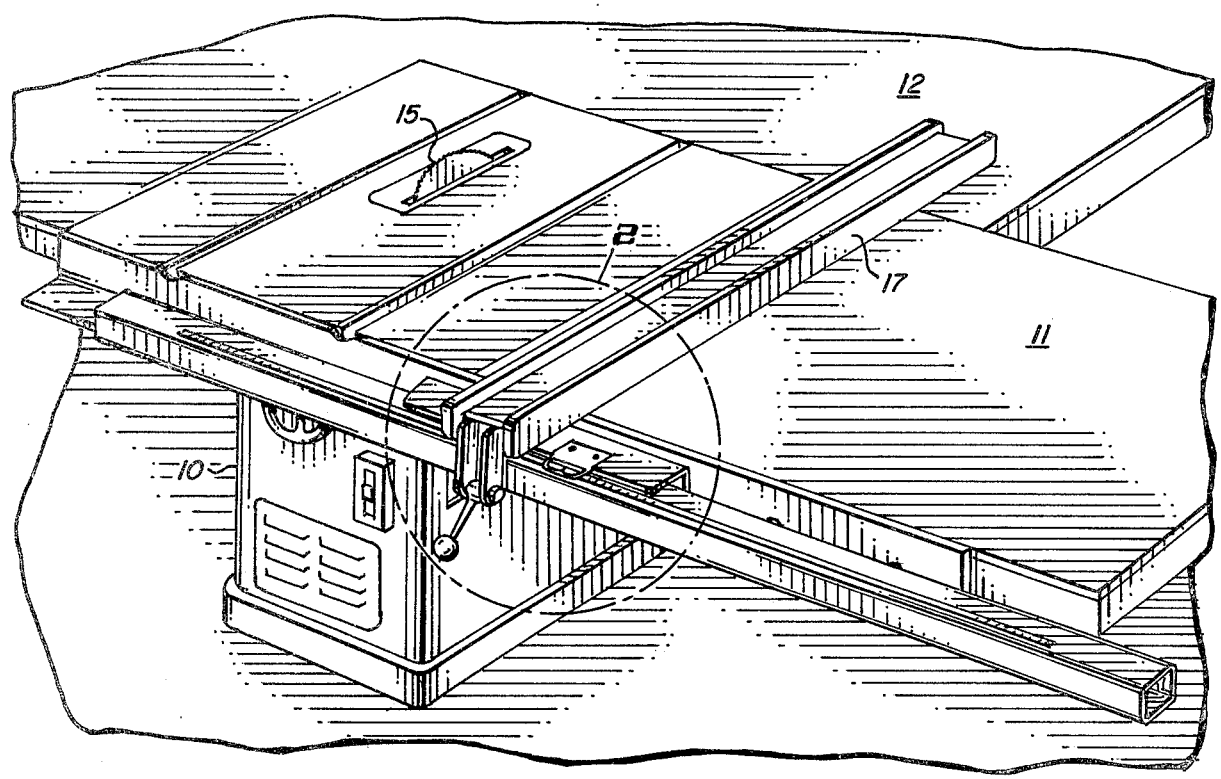
FIG. 1 is a perspective view of an improved table saw fence system incorporating the teachings of the present invention.
Figure 2:
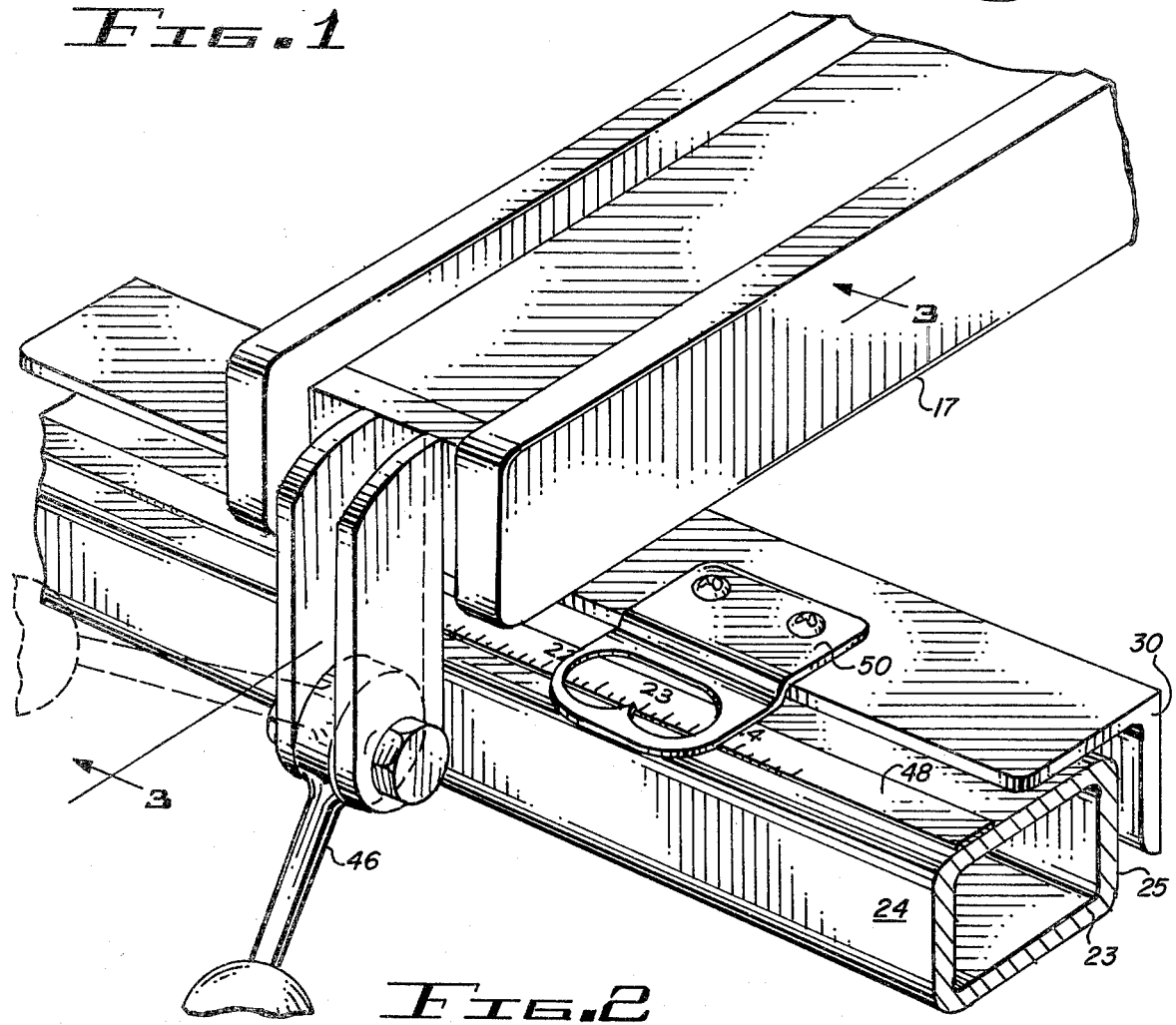
FIG. 2 is an enlarged perspective view of a portion of FIG. 1.

Referring now to the drawings, a conventional table saw 10 is shown having a work table 11 and, in the embodiment chosen for illustration, a table extension 12 mounted in a conventional fashion to provide additional work area for the table top. A circular saw blade 15 extends through a slot provided therefor in the table 11. A fence 17 is positionable on the table 11 and may be locked at predetermined distances from the saw 15 to accurately determine the position of a cut in a workpiece (not shown).

A support bracket 19 (FIG. 3) is formed of a channel member having an "L" shaped cross-section. One leg 20 of the "L" is secured to the work table while the other leg 21 supports a guide rail 23. The guide rail extends along the table 11 and includes opposing side surfaces 24 and 25 together with a top surface 26 which extends parallel to the top surface 27 of the work table 11. The guide rail, in the embodiment chosen for illustration, incorporates a rectangular cross section; however, other cross-sectional configurations may be used. A shoe 30 is secured to the fence 17 and slidably engages the guide rail 23. Such sliding engagement may be facilitated by including friction reducing pads such as that shown at 31 attached to the shoe 30; such friction reducing pads may be made from any of several well known materials such as Teflon.

The shoe 30 also includes a pair of contact pads 35 and 36. These contact pads are spaced apart and engage surface 25 of the guide rail 23. The contact pads 35 and 36 may be adjusted to insure that the fence 17 is parallel to the saw blade 15. While other types of contact pads may be used, the pads 35 and 36 have been found to be well suited for the present purposes. Referring particularly to FIGS. 4 and 5, the contact pads may be explained in greater detail. The pad 35 is formed of a small square piece of deformable material that is welded to the shoe 30. A set screw 38 threadedly engages a hole provided therefor in the shoe 30. The lower end 39 of the set screw engages the hidden surface of the contact pad 35. When the set screw 38 is threaded into the shoe 30, the contact pad 35 is deformed as shown in FIG. 5. The deformed portion of the contact pad 35 slidably engages the guide rail 23 and provides one of three clamping points when the fence is clamped into position.

An arm 41 attached to one end of the fence 17 and extends downwardly adjacent the guide rail 23. A clamping shoe 43 is pivotally secured to the arm 41 for movement toward and away from the surface 24 of guide rail 23. A cam 45 is rotatably mounted on the arm 41 and includes a handle 46 for manual actuation. The cam 45, when moved to a clamping position, forces the clamp shoe 43 into engagement with the surface 24 of the guide rail 23.

The guide rail 23 includes a scale 48 along the top surface 26 thereof. An index 50 is secured to the shoe 30 and is positioned to register with the markings present on the scale 48. The fence 17 may thus be moved, together with the attached shoe, to a position such as that shown in FIG. 6 wherein the index points to the number "23" thereby indicating that the distance from the fence to the saw blade is 23 inches. The fence may be clamped in this position by moving the handle 46 downwardly as shown in FIG. 3. The clamping force thus applied by the cam 45 through the clamping shoe 43 to the surface 24 of the guide rail 23 is positioned opposite and in between the reaction forces applied by the contact pads 35 and 36 on the opposite surface 25. The fence and shoe are therefore clamped by forces acting through three points to not only firmly secure the fence in place but also to insure the parallelism while the index 50 may be moved slightly through the use of fastening screws 51 and calibration slot 52 to insure the accuracy of the indicated measurement.

I claim:

1. An improved table saw fence for use on a table saw having a work table and a saw blade extending therethrough, said system comprising:
   (a) a support member for attachment to said table;
   (b) a guide rail, having a flat top surface and two flat opposing side surfaces, secured to said support member, said guide rail extending parallel to the top surface of said table;
   (c) a scale mounted on said top surface and extending therealong;
   (d) a fence;
   (e) a shoe secured to said fence and slidably engaging the flat top surface of said guide rail out of contact with said scale, said shoe including a pair of spaced apart contact pads attached thereto for sliding engagement with one of said two opposing side surfaces;
   (f) an index mounted on said shoe in registration with said scale; and
   (g) releasable clamping means secured to said fence and extending downwardly therefrom adjacent said guide rail for engaging the other of said opposing side surfaces, said clamping means positioned with respect to said spaced apart contact pads to provide three point clamping on said opposing side surfaces.

2. The combination set forth in claim 1 wherein said support member comprises a channel member having an "L" shaped cross section with one leg of the "L" secured to said table and the other leg of the "L" secured to said guide rail.

3. The combination set forth in claim 2 wherein said guide rail has a rectangular cross section.

4. The combination set forth in claim 1 wherein said clamping means includes an arm extending downwardly from said fence, and a rotatable cam mounted on said arm.

5. The combination set forth in claim 1 wherein said clamping means comprises:
   an arm extending downwardly from said fence;
   a clamping shoe pivotally secured to said arm for pivotal movement toward and away from said other of said opposing side surfaces; and
   a cam rotatably mounted on said arm, said cam engaging said clamping shoe to force said clamping shoe into clamping engagement with said other of said opposing side surfaces.

6. The combination set forth in claim 1, 2, 3, or 5, wherein said shoe includes a friction reducing pad in contact with said top surface to facilitate sliding movement between said guide rail and shoe when said clamping means is released.

7. The combination set forth in claim 1 wherein each of said contact pads comprises a soft metal piece welded to said shoe and includes screw means contacting the hidden surface of said metal piece for deforming said metal piece away from said shoe to provide a contact surface for contacting said guide rail.

* * * * *

Disclaimer 4,206,910.—*William M. Biesemeyer*, Phoenix, Ariz. TABLE SAW FENCE SYSTEM. Patent dated June 10, 1980. Disclaimer filed June 6, 1983, by the inventor.

Hereby enters this disclaimer to claims 1 through 7 of said patent.

[*Official Gazette July 19, 1983.*]